UNITED STATES PATENT OFFICE.

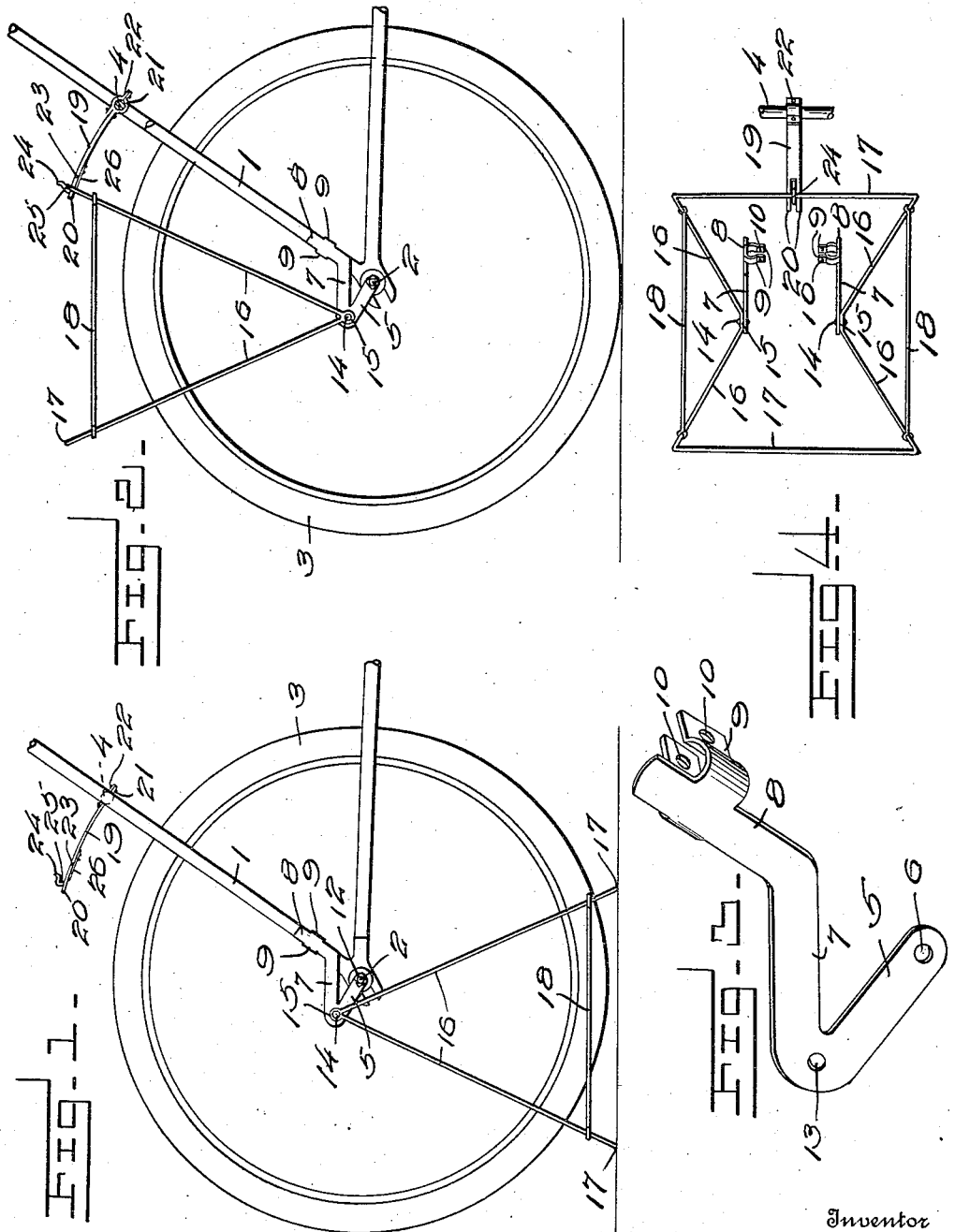

HUGO W. ZELINSKY, OF TACOMA, WASHINGTON.

BICYCLE-STAND.

1,016,195.   Specification of Letters Patent.   Patented Jan. 30, 1912.

Application filed June 20, 1911. Serial No. 634,213.

*To all whom it may concern:*

Be it known that I, HUGO WILLIAM ZELINSKY, a citizen of the United States, residing at Tacoma, in the county of Pierce and State of Washington, have invented certain new and useful Improvements in Bicycle-Stands, of which the following is a specification.

My invention relates to improvements in bicycle stands, and has for its leading object the provision of an improved simple stand which may be readily secured to an ordinary bicycle or motor-cycle which will serve when depressed to support the cycle in upright position, and when in upwardly swung position will serve as a luggage carrier.

A further object of my invention is the provision of an improved arm for supporting the cycle stand which arm may be readily secured to the rear axle of the cycle and will serve both as a secure attachment for the stand to retain the same in position on the cycle and will also serve as a locking washer for the rear axle.

Other objects and advantages of my improved motor-cycle stand will be apparent from the following description taken in connection with the accompanying drawings, and it will be understood that I may make any modifications in the specific structure shown and described within the scope of my claim without departing from or exceeding the spirit of the invention.

Figure 1 represents a side elevation of my device applied to a wheel, illustrating its use as a supporting stand. Fig. 2 represents a similar view of a wheel illustrating the stand used as a luggage support. Fig. 3 represents a detailed view of the supporting frame, and Fig. 4 represents a plan view of the stand and supporting hook in engagement therewith.

In the drawings, the numeral 1 designates the arms of the rear fork of the bicycle. said arms having secured at their lower ends the rear axle 2 and being connected above the circle of movement of the wheel 3 by the brace tube 4. Engaged upon the outer end of the axle spindle 2 on each side of the bicycle is the supporting plate of my improved bicycle support, said plate having an arm 5 provided with an aperture 6 through which the axle spindle passes. the plate extending reversely in a second arm 7 projecting at an acute angle to the arm 5 and having an upwardly extending arm 8 to rest against the outer side of one of the arms 1 of the rear fork. Said arm or portion 8 of the plate has formed integral therewith a pair of tongues 9 which are bent or curved to extend inward around the arm 1 and have apertures 10 therein through which is passed a clamping bolt (not shown) which lies on the opposite side of the arm 1 from the plate arm 8 and thus serves to secure the arm 8 in fixed position.

Mounted on the axle 2 exterior to the arm 5 of the plate is a nut 12 which secures the plate in position on the rear axle, the plate thus serving as a washer between the axle securing nuts and the nut 12 to prevent working loose of the axle securing nut.

Secured in the aperture 13 formed at the vertex of the arms 5 and 7 is the pivot pin 14 on which is rotatably mounted the eye 15 of the pair of rods or wires 16 which diverge from each other to provide a pair of supporting legs at each side of the machine or cycle, said legs on each side being connected on their lower ends by the brace 18, while the ends of corresponding legs on opposite sides of the cycle are connected by the portions 17 integral with the said legs, the members 17 and 18 together forming a rectangular base for the stand when used to support the cycle, and forming a baggage rest when the stand is in upwardly swung position.

To retain the stand in upwardly swung position, I employ my improved locking hook comprising a bar 19 having an upwardly curving bifurcated end 20 and having its other end formed into a pair of bifurcated lugs 21, said lugs 21 fitting around the brace 4 and being connected by bolts 22 to secure the hook member firmly in position. Pivoted between the furcations 20 by the pin 23 is the hook member 24 having a recess 25 to engage one of the rods 17 of the stand frame, a blade spring 26 having one end secured to the bar 19 and the other bearing against hook member to resiliently force it upward and hold it in engagement with the stand frame.

From the foregoing description taken in connection with the drawings it will be seen that I have provided an improved cycle stand which will serve to support the cycle in upright position or when swung upward will provide a baggage carrier and it will be further observed that I have provided a novel and an improved plate for attaching the stand to the cycle and also an improved readily attachable hook for folding the stand in elevated position to serve as a luggage carrier.

I claim:—

The combination with the rear fork of a cycle, of an axle spindle mounted therein, a V-shaped plate having one end mounted on the axle, the other end of the plate having a laterally projecting arm resting against an arm of the fork, said projecting arm having rigidly integrally formed inwardly extending tongues spanning the arm of the fork, means for securing said tongues to the fork, a similar plate secured to the other arm of the fork at the opposite end of the axle spindle, pivot pins projecting outwardly from the vertices of the plates, and a combined stand and luggage support having the ends of its arms pivotally secured to the pivot pins.

In testimony whereof I affix my signature, in the presence of two witnesses.

HUGO W. ZELINSKY.

Witnesses:
S. ZELINSKY,
A. O. WALL.

Copies of this patent may be obtained for five cents each, by addressing the "Commissioner of Patents, Washington, D. C."